United States Patent
Efraimsson et al.

(10) Patent No.: US 6,448,493 B1
(45) Date of Patent: Sep. 10, 2002

(54) SUSPENSION DEVICE HAVING A CABLE CARRIAGE INTEGRAL THEREWITH

(75) Inventors: Lars Efraimsson; Per Dahlberg, both of Falun; Johan Tapper, Hedemora; Jonas Nordlöf, Avesta, all of (SE)

(73) Assignee: Telefonatiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/856,636

(22) PCT Filed: Nov. 19, 1999

(86) PCT No.: PCT/SE99/02123

§ 371 (c)(1), (2), (4) Date: Nov. 8, 2001

(87) PCT Pub. No.: WO00/31845

PCT Pub. Date: Jun. 2, 2000

(30) Foreign Application Priority Data

Nov. 25, 1998 (SE) .............................. 9804035

(51) Int. Cl.$^7$ ................................ H02G 7/00
(52) U.S. Cl. ................... 174/40 R; 174/40 TD; 174/42; 174/43; 174/45 TD; 174/70 A; 248/49; 248/58; 248/63
(58) Field of Search ............... 174/40 R, 40 TD, 174/42, 43, 45 TD, 70 A; 248/49, 58, 63

(56) References Cited

U.S. PATENT DOCUMENTS

| 4,388,487 A | * | 6/1983 | Petrossian-Avakian ...... 174/139 |
| 4,663,496 A | * | 5/1987 | Peek, Jr. ...................... 174/41 |

FOREIGN PATENT DOCUMENTS

| DE | 2830193 A | 1/1979 |
| FI | 95423 | 10/1995 |
| GB | 2178908 A | 2/1987 |
| NO | 175880 | 9/1994 |
| WO | WO98/16981 | 4/1998 |

* cited by examiner

Primary Examiner—Dean A. Reichard
Assistant Examiner—Jinhee J Lee
(74) Attorney, Agent, or Firm—Burns, Doane, Swecker & Mathis, L.L.P.

(57) ABSTRACT

The present invention relates to a combined cable suspension device and cable carriage. To enable a cable suspension device (1) to be used also as a cable carriage, the suspension device has been provided with a rotatable cable support (2) which can be moved upwards in the device providing a rotatable support for the cable when the cable is moved out of contact with the cable abutment surfaces (3) in the suspension device. This type of device that incorporates a cable carriage facility enables a cable to be drawn and secured and released as required.

4 Claims, 3 Drawing Sheets

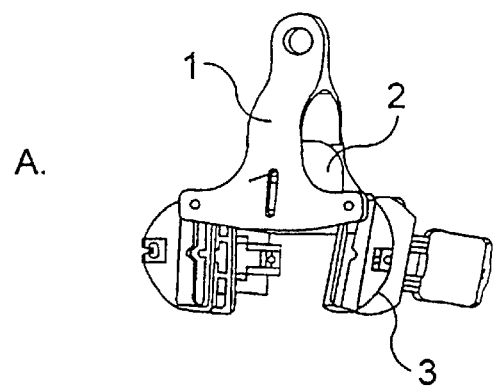
A.
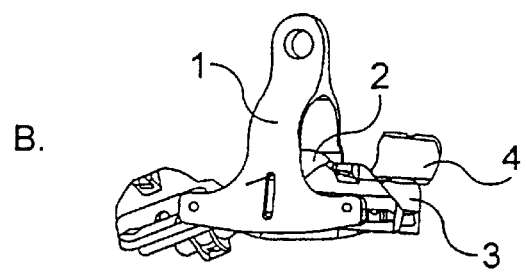
B.
Fig. 4
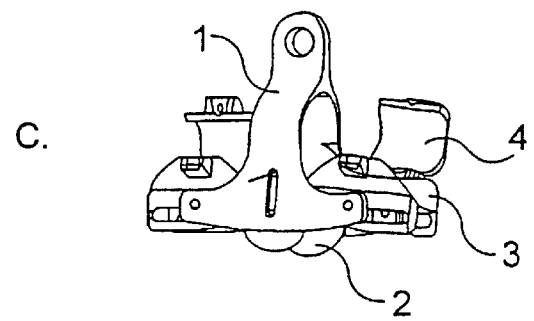
C.
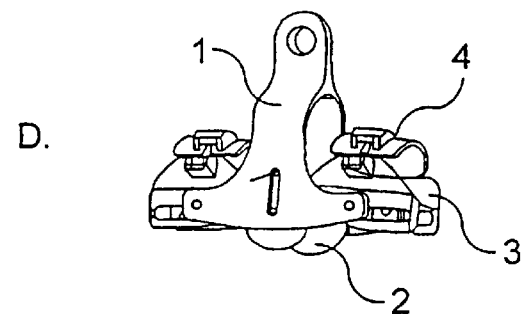
D.

SUSPENSION DEVICE HAVING A CABLE CARRIAGE INTEGRAL THEREWITH

FIELD OF INVENTION

The present invention relates to a combined cable suspension device and cable carriage, preferably for heavier cables. Overhead cables, or self-supporting cables, are suspended from posts with the aid of suspension devices fastened thereto. Cable carriages in which a cable can be pulled forwards when raised are used to draw cables to the post-mounted suspension devices.

BACKGROUND OF THE INVENTION

Cables, such as self-supporting overhead cables, cables reinforced with helically wound reinforcements, transmission lines, etc., are normally secured to posts with the aid of suspension devices. Such devices are available in several different forms. One primary requirement of a suspension device is that it will not damage the cable suspended therein. Among other things, the pressure acting on the cable must not be so great as to permanently deform the cable. Different types of sleeves are fitted to the cable, with the intention of increasing the cable abutment surface and in further reducing the pressure on the cables. The suspension device shall also be easy to mount in a short space of time and shall be cost-effective. Consequently, a suspension device is required to incorporate a number of functions and facilities that will eliminate the use of tools, auxiliary rollers and lifting devices in mounting operations.

SUMMARY OF THE INVENTION

With the intention of enabling a cable suspension device to be also used as a cable carriage, the suspension device has been provided with a rotatable cable supporting surface, such as in the form of a movable roller, which when the suspension device is to function as a cable carriage can be moved vertically in said suspension device so as to provide a rotatable underlying surface that supports the cable when it is released from the abutment surfaces of the suspension device. A suspension device that includes a coacting cable carriage of this kind enables a cable to be drawn and fixated and readily released as required. A sleeve can be fitted around the cable when required, without needing to lift the cable with the aid of an external lifting device, such as a winch, block-and-tackle, or corresponding lifting means.

The invention will now be described in more detail with reference to preferred embodiments thereof and also with reference to the accompanying drawings.

BRIEF DESCRIPTION OF THE DRAWINGS

FIGS. 4A–D show different working positions of the combined suspension device and cable carriage according to the invention.

DESCRIPTION OF PREFERRED EMBODIMENTS

Figure 1:
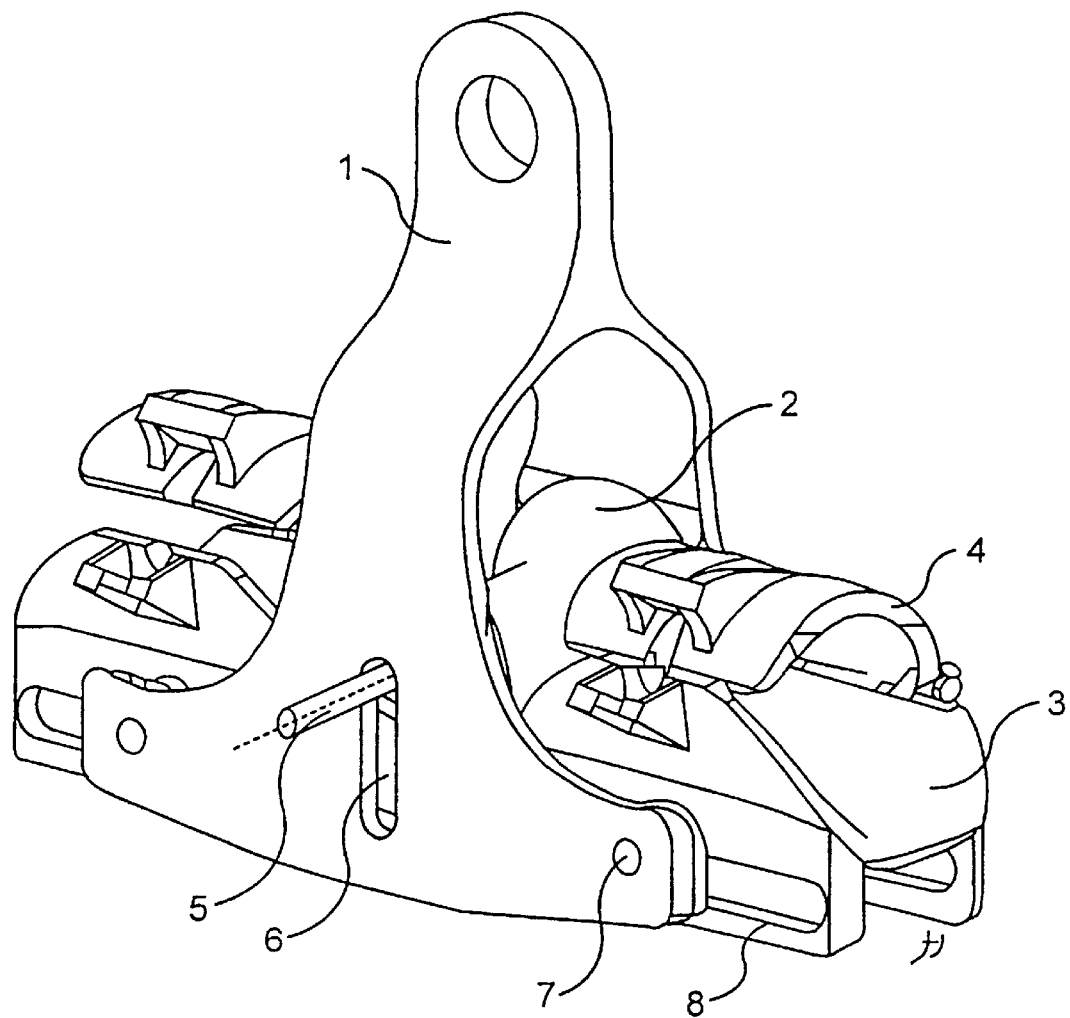
FIG. 1 illustrates a combined cable suspension device and cable carriage in accordance with the invention.
Figure 2:
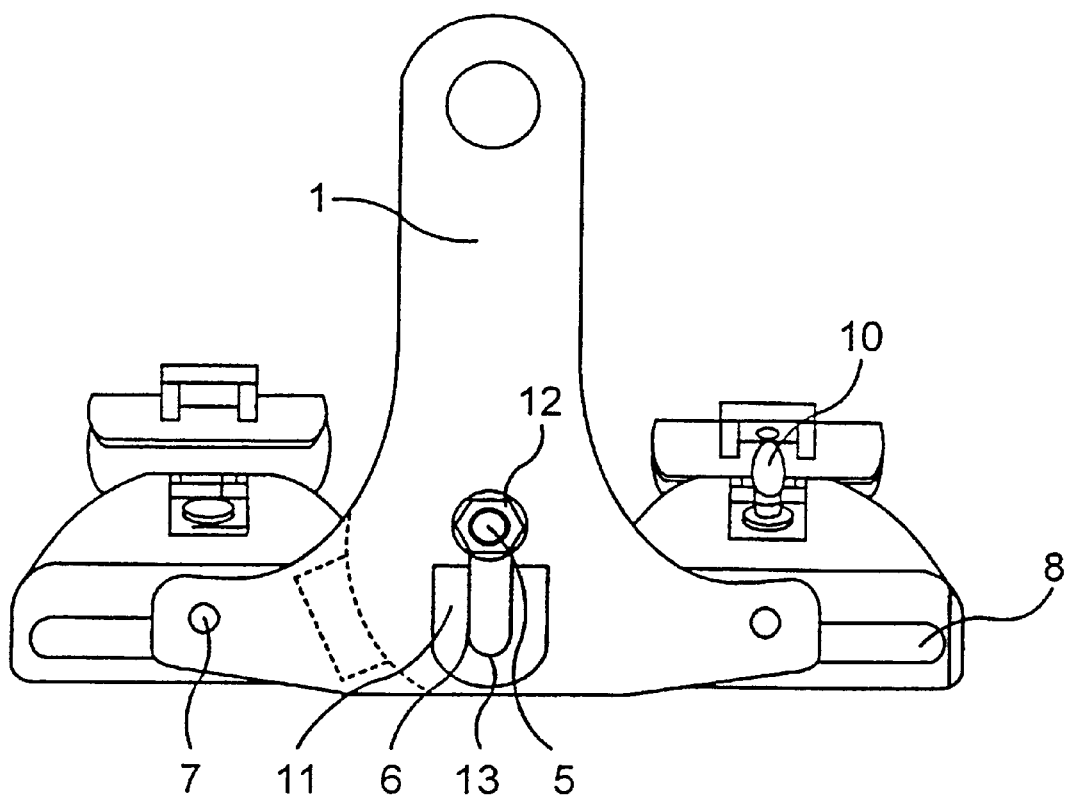
FIG. 2 is a side view of the combined suspension device and cable carriage.

The suspension device 1 and said incorporated cable carriage function fulfils all requirements relating to the bearing capacity and flexibility of a cable. In the illustrated case, the rotatable support that forms a part of the cable carriage function in the suspension device has the form of a roller or wheel 2 having enlarged end regions that enable the cable to be centred in the suspension device when pulling the cable into and out of said device, in addition to a cable supportive function; see FIGS. 1 and 2. In order to prevent the cable from being subjected to excessively high pressures, it is necessary to be able to move the roller or wheel away from the cable after having drawn the cable into or out of said suspension device, so that the cable is able to rest on a wider abutment surface. According to the present invention, this wider abutment surface has the form of one or two open, lower sleeve-forming parts 3 disposed on respective sides of the wheel or roller and movably connected to the suspension device. These sleeve-forming parts are arranged in a manner which enables them to be dropped down when the cable carriage function is to be used, so as to provide space for free movement of the cable. In order to enable the cable to be secured in the suspension device, the device includes on both sides of the roller or wheel 2 above the lower sleeve-forming parts, upper sleeve-forming parts 4 which are pivotally connected to the lower sleeve-forming parts and which can be dropped down over said lower sleeve-forming parts 3 so as to secure a cable between the lower sleeve-forming parts and the upper sleeve-forming parts. As the cable is drawn into or out of the suspension device, the rotary shaft 5 of the wheel or roller 2 is fixed in the upper limit of a slot 6. The ends of the wheel shaft may be provided with threaded joints for securing the wheel shaft in this position. The open bottom parts of the cable securing sleeve are suspended on pins 7 accommodated in downwardly sloping slots or channels 8 on the bottom parts of said cable securing sleeve, wherewith the wheel is substantially free. When withdrawal of the cable is terminated, the lower parts of the sleeve are rotated and pushed in their respective slots or channels 8 until they hook firmly in a notch 9 or widening provided in the slot 8 for receiving the pins 7 and allowing the lower sleeve parts to slope to some extent; see FIG. 3. When necessary, sleeves can be applied directly to the cable or alternatively the lower and upper cable-securing sleeve parts may be provided with a suitable covering adapted to the cable concerned. When the cable has been loosened from its upper position, it will fall down onto the lower sleeve parts 3 inserted therebeneath. The upper sleeve parts 4 are dropped down over the lower sleeve parts and the cable is finally secured by securing the upper sleeve parts to the lower sleeve parts with the aid of screws 10, for instance. In order to prevent a cable suspension device the includes only one lower sleeve part and one upper sleeve part from tilting, as shown in broken lines in FIG. 2, the suspension device is provided with means, such as a counterweight or the like, which functions to balance the position of a mounted suspension device and the device carried thereby.

Figure 3:
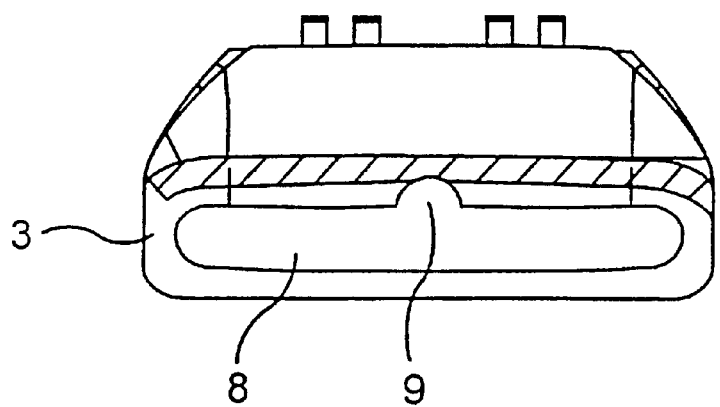
FIG. 3 is a cross-sectional view of a lower sleeve belonging to the combined suspension device and cable carriage according to the invention.

FIG. 3 is a cross-sectional view of the lower sleeve part 3 and illustrates more clearly the slot 8 and the notch or like widening 9 for receiving a pin 7 in the pivotal fixating position of the lower sleeve part.

The lower sleeve parts can be positioned readily in accordance with the angle of the cable through the medium of the pin receiving notch in said groove. This enables the entire abutment surface to be used optimally in both straight line and angled positions and in the event of temporary loads caused by a tree falling onto the cable. One personnel safety factor achieved when mounting a cable in accordance with the invention is that the cable need never be released from the suspension device after being finally secured thereto. Because of its simple construction, the combined cable suspension device and cable carriage according to the invention can be readily dismantled. After having removed the wheel shaft 5 and the pins 7 on the lower sleeve part, the top of the suspension device can be opened up and a cable that has already been drawn can be inserted into or removed from said device. After having inserted the cable into the suspension device the wheel and lower sleeve parts are replaced and secured in their respective positions, therewith providing a functional suspension device which enables the position of the cable therein to be adjusted and the cable then secured in said device.

When the outer sides 11 of the slot in said device are made non-planar, for instance made to slope slightly downwards and outwards, it will be necessary to loosen the screw joint on the wheel shaft gradually in order for the shaft to be able to move down in the slot. This means that the nut 12 of the screw joint must be backed-off, or loosened, to a greater extent the further the wheel shaft is intended to move down the slot. This can provide successive lowering of the wheel and therewith controlled wheel movement, which can be of great benefit when a load of several tonnes acts on the wheel and the suspension device in a cable drawing operation. When the device is positioned wrongly in relation to a contemplated cable direction, it can also be beneficial to be able to lower the wheel gradually in order to correctly position the suspension device. Outwardly sloping sides of the slot will also enable the slot bottom 13 to be made wider, therewith reducing the strain on the slot bottom in the event of the wheel shaft falling down in the slot.

In the cable drawing mode shown in FIG. 4A, the suspension device functions solely as a cable carriage with the option of drawing the cable out of the device. The wheel or roller 2 of the device 1 will then be in its upper position and the lower sleeve-forming abutment surfaces 3 dropped down. The cable abutment surfaces of the lower sleeve parts will therewith hang obliquely from the device in their respective slots or channels 8 so as to fully release the wheel 2 in the cable drawing mode of the combination. The wheel can be locked in this position with the aid, e.g., of a friction joint that can be tightened directly on the wheel shaft and that consists of a nut screwed onto the end thread of the shaft. Alternatively, the wheel can be locked in said position by some other means, such as a cotter, locking pin, hook or groove. The abutment surfaces of the lower and upper sleeve parts can be locked, for instance, with a wire or a plastic band capable of holding the sleeve parts together in said downwardly handing position.

FIGS. 4B and C show the mounting and fixing position of the device, in which the lower sleeve parts have been pushed up into their respective slots or channels 8 until they fall down into their centre positions, and in which any additional sleeves that may be required have been fitted around the cable positioned in the device over the cable abutment surfaces of said lower sleeve parts. When the wheel or roller 2 is released and falls down in the slot or channel 6, the cable will, at the same time, move down into abutment with the abutment surfaces of the lower sleeve parts. FIG. 4D illustrates the state of the device when the upper sleeve parts have been dropped down over the cable. The upper sleeve parts are then secured to the lower sleeve parts by means of the screw joint 10, for instance. As a result of the configuration of the abutment surfaces, the surfaces are able to position themselves automatically along the line followed by the cable in said device as a result of the pivotal suspension of said lower sleeve parts, such as a straight line or a line curvature in the proximity of a post should a tree fall onto the cable and therewith cause the cable to bend. As a result, no additional bending stresses will be applied to the cable, and the lower abutment surface can be utilised optimally. This results in a low mean value of the mechanical stresses and strains on the cable, since the whole of said abutment surface is constantly used.

It will be understood that the invention is not restricted to the aforedescribed and illustrated embodiments thereof and that modifications can be made within the scope of the following claims.

What is claimed is:

1. A combined cable suspension device and cable carriage comprising a raisable and lowerable rotatable cable supporting means, which enables a cable resting thereon to be drawn forward in said suspension device, in that at least one lower part movably connected to the suspension device is pivotally connected to an upper part, wherein said upper and lower parts function to secure a cable therebetween when brought together into a closed state, wherein the rotatable cable supporting means (2) is provided with a rotary shaft (5), ends of which are provided to be able to be movable in slots (6) of the suspension device (1) for the positioning of the rotatable supporting means in the suspension, in that said lower part includes slots or channels (8) adapted for coaction with pins (7) on said suspension device (1), wherein said lower part can take different positions relative to said suspension device, such as a freely hanging vertical position or a generally guided horizontal position, in which the cable can be secured between said lower and upper parts.

2. A combined suspension device and cable carriage according to claim 1, wherein the slots or channels (8) include a widening (9) into which the pins (7) are hooked in the mounting position, such as to allow the cable securing position to be inclined in a manner to adapt to the line angle of the cable.

3. A combined suspension device and cable carriage according to claim 1, wherein the outsides of the slots (6) are inclined to permit successive lowering of the rotatable cable support (2).

4. A combined suspension device and cable carriage according to claim 1, wherein the slots (6) have a broad bottom (13).

* * * * *